United States Patent
Chung et al.

(10) Patent No.: US 7,398,015 B2
(45) Date of Patent: Jul. 8, 2008

(54) APPARATUS FOR CONTROLLING FLUID-HEATING USING POLYMER DISK

(75) Inventors: Kwang Hyo Chung, Daejeon (KR); Se Ho Park, Daejeon (KR); Dae Sik Lee, Daejeon (KR); Hyeon Bong Pyo, Daejeon (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 11/188,911

(22) Filed: Jul. 25, 2005

(65) Prior Publication Data

US 2006/0127070 A1    Jun. 15, 2006

(30) Foreign Application Priority Data

Dec. 10, 2004  (KR) .................. 10-2004-0104286
May 10, 2005  (KR) .................. 10-2005-0038734

(51) Int. Cl.
*F24F 1/10*     (2006.01)
*C12M 1/00*    (2006.01)
(52) U.S. Cl. .................... 392/481; 435/283.1
(58) Field of Classification Search ......... 392/479–496; 435/283.1–288.7; 436/518–535
See application file for complete search history.

(56) References Cited

U.S. PATENT DOCUMENTS

| | | | | |
|---|---|---|---|---|
| 1,654,551 A | * | 1/1928 | Muhleisen | 392/479 |
| 3,293,868 A | * | 12/1966 | Gonzalez | 62/3.1 |
| 5,176,203 A | | 1/1993 | Larzul | |
| 5,897,842 A | | 4/1999 | Dunn et al. | |
| 6,180,372 B1 | * | 1/2001 | Franzen | 435/91.1 |
| 6,537,799 B2 | * | 3/2003 | Chow et al. | 435/285.2 |

FOREIGN PATENT DOCUMENTS

| | | |
|---|---|---|
| JP | 2000 208975 | 7/2000 |
| JP | 2004 061320 | 2/2004 |

OTHER PUBLICATIONS

"Cylindrical Compact Thermal-Cycling Device for Continuous-Flow Polymerase Chain Reaction" Park et al., Analytical Chemistry, vol. 75, No. 21, Nov. 1, 2003 pp. 6029-6033.
"Chemical Amplification: Continuous-Flow PCR on a Chip" Kopp et al., Science (www.sciencemag.org), vol. 280, May 15, 1998, pp. 1046-1048.

* cited by examiner

*Primary Examiner*—Sang Y Paik
(74) *Attorney, Agent, or Firm*—Ladas & Parry LLP

(57) ABSTRACT

Provided is an apparatus for controlling fluid-heating using a polymer disk, which includes: a pump for discharging fluid at a uniform flow rate; a fluid-heating module including a polymer disk to convey the fluid discharged from the pump to allow a temperature of the fluid to periodically vary; and a controller for controlling the temperature of the fluid-heating module, whereby it is possible to be adapted to a fluid device for biochemical reaction such as DNA amplification, and simply used as a disposable device, which is low cost and readily manufactured in a multiple manner.

10 Claims, 4 Drawing Sheets

APPARATUS FOR CONTROLLING FLUID-HEATING USING POLYMER DISK

CROSS-REFERENCE TO RELATED APPLICATION

This application claims the benefit of Korean Patent Application No. 2004-104286, filed Dec. 10, 2004 and Korean Patent Application No. 2005-38734, filed May 10, 2005, the disclosure of which is hereby incorporated herein by reference in its entirety.

BACKGROUND

1. Field of the Invention

The present invention relates to an apparatus for controlling fluid-heating using a polymer disk, and more particularly, to an apparatus for controlling fluid-heating using a polymer disk, which includes a spiral channel formed in a circular polymer disk, an inlet part formed on the polymer disk to allow fluid to be introduced through the inlet part to flow through the spiral channel using an external pump, and a plurality of heat blocks disposed on the surfaces of the polymer disk and uniformly maintaining different temperatures to cause a temperature of the fluid to vary as it flows along the blocks.

2. Discussion of Related Art

Generally, a biochip, a biosensor, and a chemical sensor for performing a biochemical analysis mostly require to vary a temperature of fluid in a certain extent to generate predetermined reaction, and for this purpose, various heating methods have been proposed.

For example, in the case of a DNA amplifying device for amplifying DNA in a certain temperature cycling manner by adding an enzyme into a DNA template, the temperature cycling varies the temperature of the fluid with two or three different temperatures.

That is, the temperature of fluid is varied in order to perform denaturation for separating DNA helix into single DNA strands, annealing for DNA template's searching the complementary position, and extension for restructuring the DNA helix of double strands.

The typical heating method is classified into two types, i.e., one type of varying a temperature of fluid by applying temperature variations from the exterior to the fluid filled and stayed in a chamber, and the other type of varying a temperature of the fluid by conveying the fluid to environment having a desired temperature condition. The present invention is belongs to the latter.

In this process, since an external temperature condition can be uniformly maintained, the latter has an advantage capable of rapidly and precisely varying the temperature of the fluid. Meanwhile, the former has disadvantages of consuming a plenty of time and requiring additional control to thereby make a process complicate, in order to vary the external temperature condition when the external environment has large heat capacity.

Therefore, various methods for varying the temperature more rapidly have been proposed. However, the latter requires to control conveyance of the fluid and to have a large space for forming a certain temperature condition.

SUMMARY OF THE INVENTION

The present invention, therefore, solves aforementioned problems associated with conventional devices by providing an apparatus for controlling fluid-heating using a polymer disk, which includes a spiral channel formed in a circular polymer disk, an inlet part formed on the polymer disk to allow fluid to be introduced through the inlet part to flow through the spiral channel using an external pump, and a plurality of heat blocks disposed on the surfaces of the polymer disk and uniformly maintaining different temperatures to cause a temperature of the fluid to vary as it flows along the blocks, thereby minimizing and simplifying the external controls to reduce the manufacturing and operating cost.

In an exemplary embodiment of the present invention, an apparatus for controlling fluid-heating using a polymer disk, which includes: a pump for discharging fluid at a uniform flow rate; a fluid-heating module including a polymer disk to convey the fluid discharged from the pump to allow a temperature of the fluid to periodically vary; and a controller for controlling the temperature of the fluid-heating module.

In this process, the polymer disk may have: inlet and outlet parts that are formed at one side thereof and spaced apart from each other to introduce and discharge the fluid; and a spiral channel connected between the inlet and outlet parts to convey the fluid.

The fluid-heating module may includes: heat blocks disposed at upper and lower parts of the polymer disk to be maintained at a uniform temperature; heater plates disposed at surfaces of the heat blocks to be heated to a certain temperature depending on a control signal from the controller; and support plates for supporting the heat blocks and the heater plates to be adhered to each other through the medium of the polymer disk.

The heater plates and the heat blocks may have a plurality of sector shapes separated to be thermally isolated from each other.

The fluid-heating module may further include insulating plates for preventing a heat loss between the heater plates and the support plates.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein.

Figure 1:
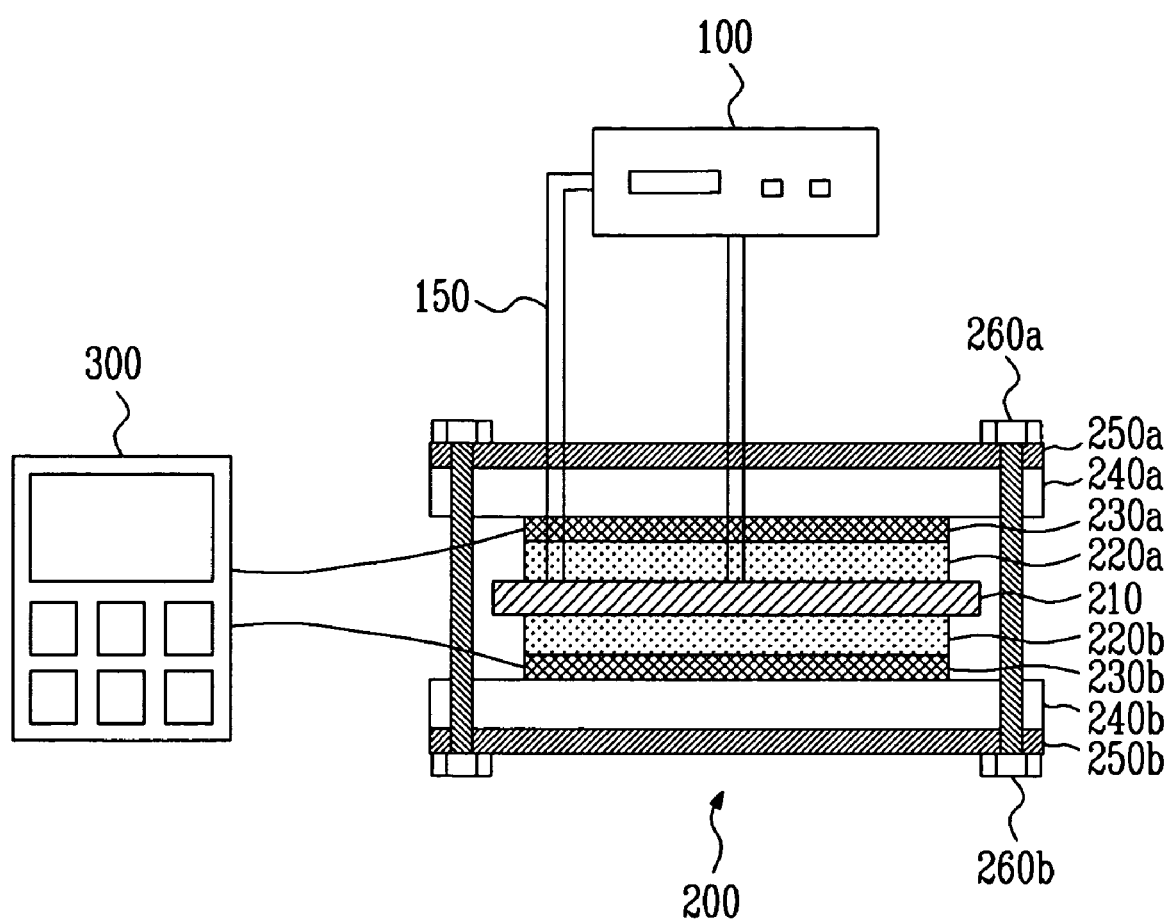
FIG. 1 is a view illustrating an entire configuration of an apparatus for controlling fluid-heating using a polymer disk in accordance with an embodiment of the present invention.
Figure 2:
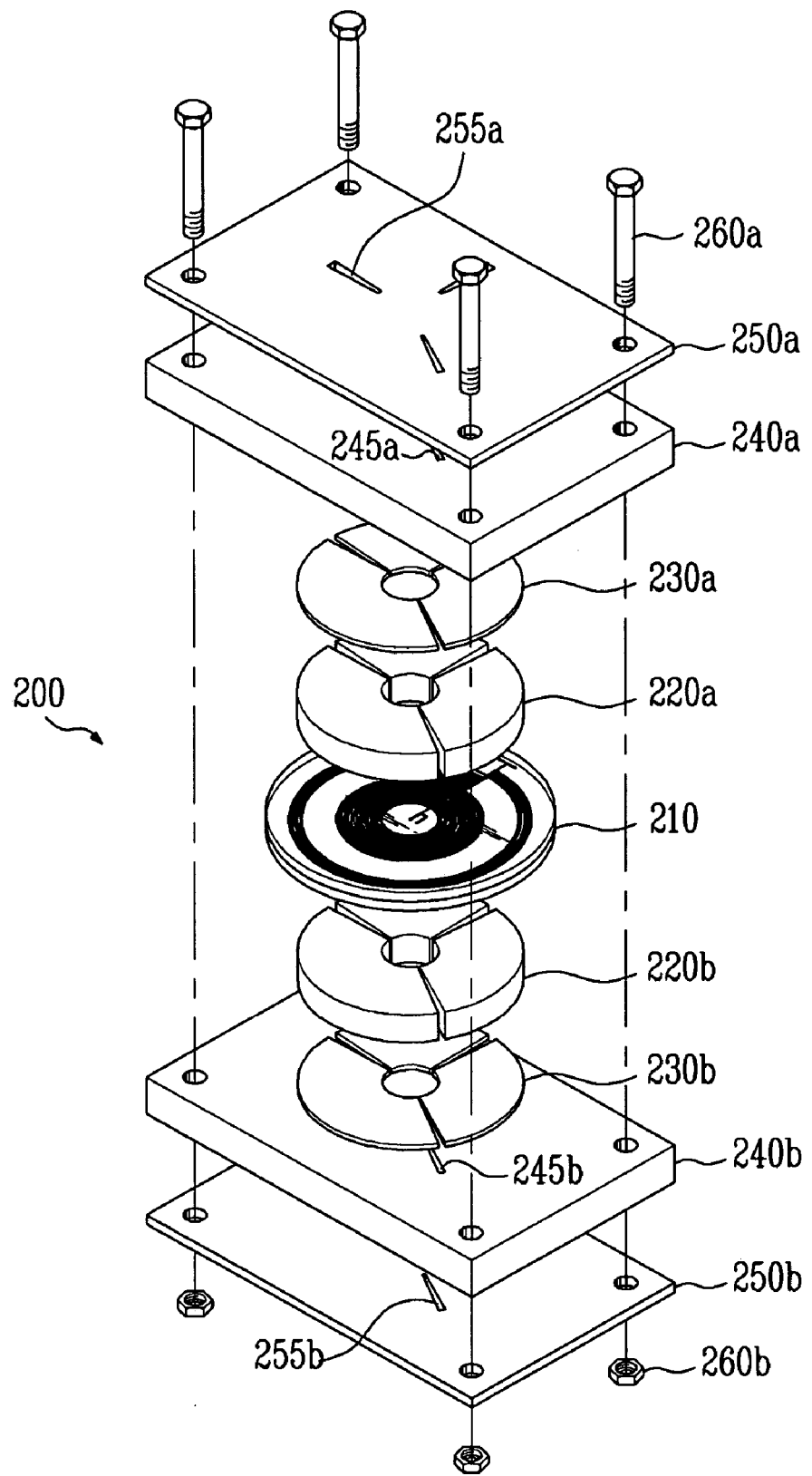
FIG. 2 is an exploded perspective view illustrating a fluid-heating module of FIG. 1.
Figure 3:
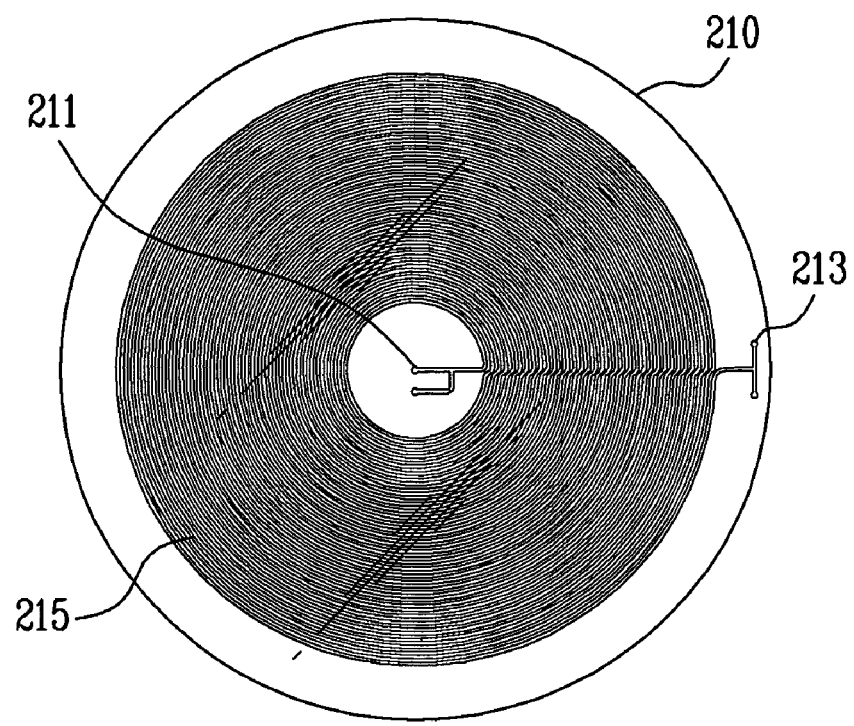
FIG. 3 is a plan view of a polymer disk of FIG. 2.
Figure 4:
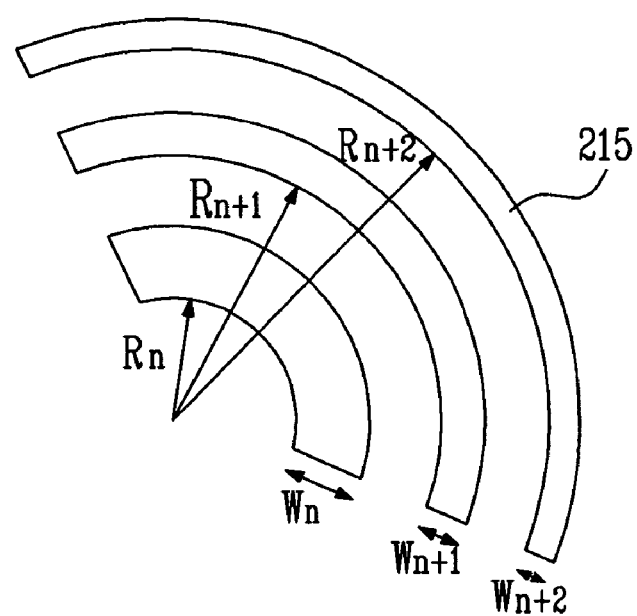
FIG. 4 is a conceptual view illustrating a spiral channel of the polymer disk of FIG. 2.

FIG. 1 is a view illustrating an entire configuration of an apparatus for controlling fluid-heating using a polymer disk in accordance with an embodiment of the present invention, FIG. 2 is an exploded perspective view illustrating a fluid-heating module of FIG. 1, FIG. 3 is a plan view of a polymer disk of FIG. 2, and FIG. 4 is a conceptual view illustrating a spiral channel of the polymer disk of FIG. 2.

Referring to FIGS. 1 to 4, the apparatus for controlling fluid-heating using a polymer disk in accordance with an embodiment of the present invention includes a pump 100, a fluid-heating module 200, and a controller 300.

In this process, the pump 100 functions to discharge the fluid at a uniform flow rate. At this time, preferably, the pump 100 injects and ejects the fluid into and from a polymer disk 210 of the fluid-heating module 200 through a connecting tube 150.

The fluid-heating module 200 functions to vary the temperature of the fluid discharged from the pump 100 periodically.

The fluid-heating module 200 includes the polymer disk 210, heat blocks 220a and 220b, heater plates 230a and 230b, insulating plates 240a and 240b, and support plates 250a and 250b.

The polymer disk 210 is composed of circular upper and lower plates adhered to each other. An inlet and outlet parts 211 and 213 is formed at one side of the upper and lower plates and spaced apart from each other to introduce and discharge the fluid. Meanwhile, if necessary, a plurality of inlet parts 211 and a plurality of outlet parts 213 may be formed.

At this time, the upper and lower plates may be adhered using a general adhesive agent or welding, ultrasonic welding, bonding, and so on, depending on a material composing the plates.

In addition, a spiral channel 215 is formed on the upper or lower plates to connect the inlet and outlet parts 211 and 213 of the polymer disk 210 to convey the fluid.

Preferably, the spiral channel 215 is formed so that the fluid has a regular period per one cycle. As shown in FIG. 4 the spiral channel 215 is formed to have a uniform depth, and formed to have decreasing widths ($W_n$, $W_{n+1}$, $W_{n+2}$) as the radius ($R_n$, $R_{n+1}$, $R_{n+2}$) increases, but not limited thereto. The spiral channel 215 may have a uniform width and varying depths that decrease from the center to the periphery of the polymer disk 210. That is, the width and depth of the spiral channel 215 may be adjusted depending on the purpose of the temperature cycling.

In addition, one of biological, chemical, and optical processes (for example, oil, BSA solution, or plasma treatment) may be performed at a surface of the spiral channel 215 in order to prevent impurities such as a biomolecule entrained in the fluid from adsorbing.

The spiral channel 215 may be fabricated using various methods such as a hot embossing method, an injection molding method, a casting method, a stereolithography method, a laser ablation method, a rapid prototyping method, a silk screen method, a numerical control (NC) machining method, or the like.

While the spiral channel 215 in accordance with an embodiment of the present invention has a circular shape, but not limited thereto, may have various shapes such as an oval or polygonal shape.

In addition, preferably, the polymer disk 210 may be formed of one material selected from the group consisting of polymethylmethacrylate (PMMA), polycarbonate (PC), cycloolefin copolymer (COC), polydimethylsiloxane (PDMS), polyamide (PA), polyethylene (PE), polypropylene (PP), polyethylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), and perfluoralkoxyalkane (PFA).

The heat blocks 220a and 220b are disposed on and under the polymer disk 210 to uniformly maintain the temperature of the polymer disk 210. That is, the heat blocks 220a and 220b are heated up to a certain temperature by the heater plates 230a and 230b to maintain a certain temperature, and in contact with the polymer disk 210 to transmit the heat to the polymer disk 210.

The heat blocks 220a and 220b are formed to have a plurality of sector shapes spaced apart from each other in order to be thermally isolated so that the heat blocks 220a and 220b have different temperature regions.

While the heat blocks 220a and 220b in accordance with an embodiment of the present invention are disposed on and under the polymer disk 210, but not limited thereto, may be additionally disposed at exterior sides of the support plates 250a and 250b.

The heater plates 230a and 230b are disposed on surfaces of the heat blocks 220a and 220b, respectively, to be heated up to a certain temperature depending on a control signal of the controller 300, and preferably, have the same area as the heat blocks 220a and 220b.

General temperature sensors (not shown) may be installed at appropriate positions of the heat blocks 220a and 220b and the heater plates 230a and 230b, and connected to the controller 300 to detect the temperature thereof. Meanwhile, if necessary, the sector-shaped heat blocks 220a and 220b and the sector-shaped heater plates 230a and 230b may be formed to have various sizes and numbers.

The insulating plates 240a and 240b are installed between the heater plates 230a and 230b and the support plates 250a and 250b to prevent a heat loss. That is, it is possible to guide the heat emitted from the heater plates 230a and 230b toward the polymer disk 210 and to prevent thermal interference between the heat blocks 220a and 220b.

See-through holes 245a and 245b may be additionally formed in the insulating plates 240a and 240b to observe the fluid flowed through the spiral channel 215 formed in the polymer disk 210, thereby enabling confirmation of fluid conveyance and insulation or optical measurement.

At this time, preferably, the see-through holes 245a and 245b are formed at the same position as gaps between the sector shapes of the heat blocks 220a and 220b and the heater plates 230a and 230b when the fluid-heating module 200 is assembled.

In addition, mounting grooves (not shown) may be formed on the insulating plates 240a and 240b to stably mount the heat blocks 220a and 220b and the heater plates 230a and 230b.

Meanwhile, the heat blocks 220a and 220b and the heater plates 230a and 230b may be closely adhered to each other to be fixed to the insulating plates 240a and 240b using a conventional adhesive agent.

The support plates 250a and 250b are disposed at upper and lower sides about the polymer disk 210 to be fixed using a general fastening means such as bolts 260a and nuts 260b so that the heat blocks 220a and 220b and the heater plates 230a and 230b are closely adhered to each other.

In addition, see-through holes 255a and 255b may be additionally formed in the support plates 250a and 250b to observe the fluid flowing through the spiral channel 215 formed in the polymer disk 210, similar to the see-through holes 245a and 235b formed in the insulating plates 240a and 240b.

At this time, preferably, the see-through holes 255a and 255b are formed at the same position as gaps between the sector shapes of the heat blocks 220a and 220b and the heater plates 230a and 230b when the fluid-heating module 200 is assembled.

Hereinafter, an operation of the apparatus for controlling fluid-heating using a polymer disk in accordance with an embodiment of the present invention will be described.

Figure 5:
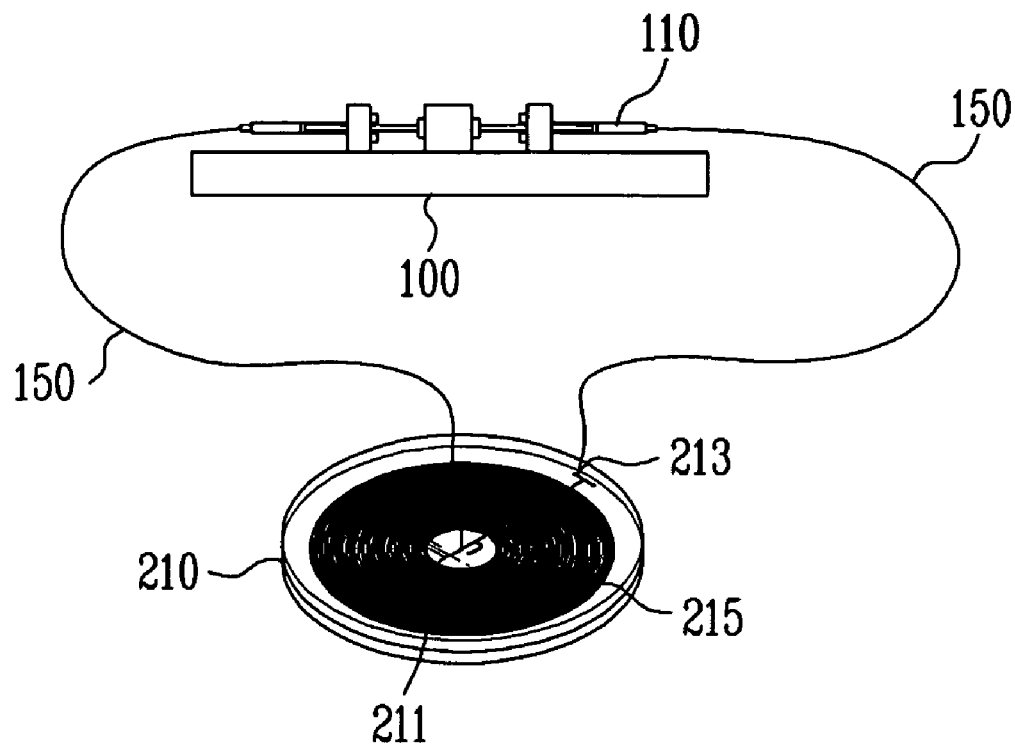
FIG. 5 is a schematic view illustrating a fluid conveying process through a polymer disk in accordance with an embodiment of the present invention.

FIG. 5 is a schematic view illustrating a fluid conveying process through a polymer disk in accordance with an embodiment of the present invention.

Referring to FIGS. 1 to 5, the fluid, which is to be conveyed into a syringe 110 of the pump 100, is introduced into the inlet part 211 of the polymer disk 210 through the connecting tube 150.

The fluid introduced into the inlet part 211 moves along the spiral channel 215 at a uniform flow rate, and then is collected at the syringe 110 disposed opposite to the pump 100 through the connecting tube 150 connected to the outlet part 213.

At this time, the fluid that is conveyed through the spiral channel 215 moves in the state that the temperature cycling was performed by the heater plates 230a and 230b and the heat blocks 220a and 220b heated to a certain temperature depending on a control signal of the controller 300.

Meanwhile, preferably, the temperature cycling is automatically performed until the fluid is discharged through the outlet part 213 of the polymer disk 210 using only a simple pumping operation after the fluid is introduced into the inlet part 211 of the polymer disk 210.

Therefore, the apparatus for controlling fluid-heating using the polymer disk in accordance with an embodiment of the present invention is capable of conveying the fluid to allow the temperature of the fluid to periodically vary.

Figure 6:
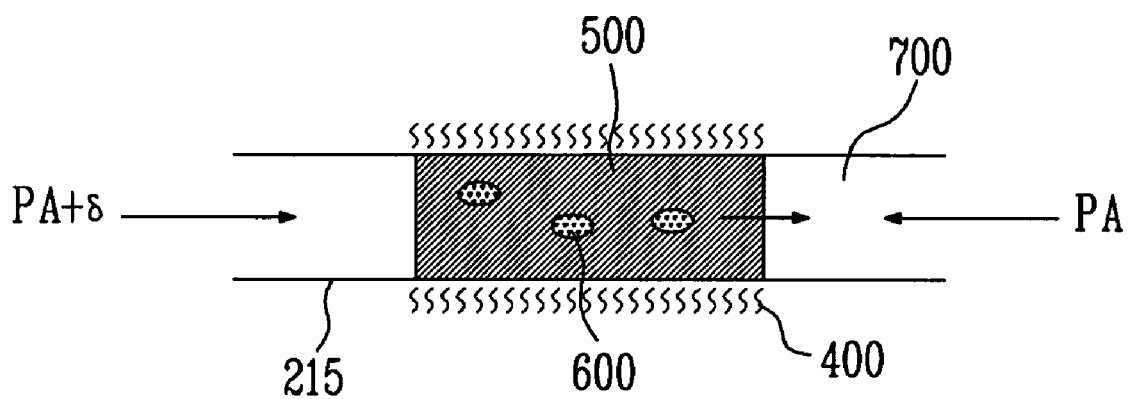
FIG. 6 is a conceptual view illustrating a process of removing bubbles generated in fluid that is conveyed through a channel of a polymer disk in accordance with an embodiment of the present invention.

FIG. 6 is a conceptual view illustrating a process of removing bubbles generated in fluid that is conveyed through a channel of a polymer disk in accordance with an embodiment of the present invention.

Referring to FIG. 6, the apparatus for controlling fluid-heating using the polymer disk in accordance with an embodiment of the present invention applies heat 400 to the fluid to make the temperature of the fluid reach saturation vapor pressure, thereby generating bubbles 600 in the liquid, i.e., the conveying fluid 500.

The bubbles 600 may interfere with the uniform flow of the conveying fluid 500. Therefore, in order to prevent the bubbles 600 from generating, the conveying fluid 500 may be compressed in both directions. That is, when the compression pressure $P_A$ is larger than the saturation vapor pressure, the bubbles 600 may be less generated. In this case, the fluid may be moved through the channel by adding a minor pressure difference 8 to the compression pressure $P_A$.

In addition, the bubbles 600 may be less generated using a different kind of fluid 700, which is to be unmixed with the conveying fluid 500.

As can be seen from the foregoing, the apparatus for controlling fluid-heating using a polymer disk in accordance with an embodiment of the present invention can form the spiral channel in the circular polymer disk, introduce the fluid into the inlet part formed in the polymer disk to flow through the spiral channel using the pump, and simultaneously, dispose the plurality of heat blocks maintained at different temperatures on the surface of the polymer disk so that the temperature of the fluid varies as the fluid flows, thereby minimizing and simplifying the external control, and reducing the manufacturing and operating cost.

In addition, the present invention is applicable to various biochips, biosensors and chemical sensors, and especially, a fluid device for biochemical reaction such as DNA amplification.

Further, the present invention is capable of simply using as a disposable device and reducing a spatial volume of the apparatus by adapting the polymer disk, which is readily manufactured in a multiple manner.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An apparatus for controlling fluid-heating using a polymer disk, comprising:
   a pump for discharging fluid at a uniform flow rate;
   a fluid-heating module including a polymer disk to convey the fluid discharged from the pump to allow a temperature of the fluid to periodically vary;
   heat blocks disposed at upper and lower parts of the polymer disk to be maintained at a uniform temperature;
   heater plates disposed on surfaces of the heat blocks to be heated to a certain temperature depending on a control signal from the controller; and
   support plates for supporting the heat blocks and the heater plates to be adhered to each other through the medium of the polymer disk
      wherein the heater plates and the heat blocks are formed in a plurality of sector shapes and separated to be thermally isolated from each other, and
   a controller for controlling the temperature of the fluid-heating module.

2. The apparatus according to claim 1, wherein the polymer disk has:
   inlet and outlet parts that are formed at one side thereof and spaced apart from each other to introduce and discharge the fluid; and
   a spiral channel connected between the inlet and outlet parts to convey the fluid.

3. The apparatus according to claim 2, wherein the spiral channel has a uniform depth, and a width that decreases from a center to a periphery of the polymer disk.

4. The apparatus according to claim 2, wherein the spiral channel has a uniform width, and a depth that decreases from a center to a periphery of the polymer disk.

5. The apparatus according to claim 2, wherein one of biological, chemical, and optical processes is performed at a surface of the spiral channel in order to prevent impurities entrained in the fluid from adsorbing.

6. The apparatus according to claim 1, wherein the polymer disk is formed of one material selected from a group consisting of polymethylmethacrylate, polycarbonate, cycloolefin copolymer, polydimethylsiloxane, polyamide, polyethylene, polypropylene, polyethylene ether, polystyrene, polyoxymethylene, polyetheretherketone, polytetrafluoroethylene, polyvinylohloride, polyvinylidene fluoride, polybutyleneterephthalate, fluorinated ethylenepropylene, and perfluoralkoxyalkane.

7. The apparatus according to claim 2, wherein the support plates have see-through holes for observing a flow of the fluid that flows through the spiral channel formed in the polymer disk.

8. The apparatus according to claim 2, further comprising insulating plates for preventing a heat loss between the heater plates and the support plates.

9. The apparatus according to claim 8, wherein the insulating plates have see-through holes for observing a flow of the fluid that flows through the spiral channel formed in the polymer disk.

10. The apparatus according to claim 1, wherein the pump applies a positive pressure higher than saturation vapor pressure to both inlet and outlet parts of the polymer disk to prevent bubbles from generating in the fluid.

* * * * *